United States Patent [19]

Iwahashi et al.

[11] Patent Number: 4,937,869
[45] Date of Patent: Jun. 26, 1990

[54] PHONEMIC CLASSIFICATION IN SPEECH RECOGNITION SYSTEM HAVING ACCELERATED RESPONSE TIME

[75] Inventors: Hiroyuki Iwahashi; Toru Ueda, both of Nara, Japan

[73] Assignee: Computer Basic Technology Research Corp., Tokyo, Japan

[21] Appl. No.: 706,528

[22] Filed: Feb. 28, 1985

[30] Foreign Application Priority Data

Feb. 28, 1984 [JP] Japan .................................. 59-39148

[51] Int. Cl.⁵ ............................................... G10L 5/06
[52] U.S. Cl. ................................................... 381/43
[58] Field of Search ................................. 381/36–50; 364/513.5

[56] References Cited

U.S. PATENT DOCUMENTS

| | | | |
|---|---|---|---|
| 3,466,394 | 9/1969 | French | 381/42 |
| 3,483,941 | 12/1969 | Brady | 381/41 |
| 3,679,830 | 7/1972 | Uffelman et al. | 381/41 |
| 3,881,059 | 4/1975 | Stewart | 381/48 |
| 3,940,565 | 2/1976 | Lindenberg | 381/43 |
| 3,946,157 | 3/1976 | Dreyfus | 381/43 |
| 4,092,493 | 5/1978 | Rabiner et al. | 381/43 |
| 4,282,405 | 8/1981 | Taguchi | 381/49 |
| 4,435,617 | 3/1984 | Griggs | 381/43 |
| 4,509,186 | 4/1985 | Omura et al. | 381/43 |
| 4,516,215 | 5/1985 | Hakaridani et al. | 381/43 |
| 4,625,287 | 11/1986 | Matsuura et al. | 381/41 |

OTHER PUBLICATIONS

Sambur et al., "A Speaker Independent Digit-Recognition System", The Bell System Technical Journal, vol. 54, No. 1, Jan. 1975, pp. 81–102.

Flanagan, "Speech Analysis Synthesis and Perception" Springer-Verlag, pp. 162–163.

Ewing et al., "Computer Recognition of Speech Using Zero-Crossing Information", IEEE Trans. Audio and Electroacoustics, vol. AU-17, No. 1 pp. 37–40 Mar. 1969.

Purton, "Speech Recognition Using Autocorrelation Analysis", IEEE Trans. Audio and Electroacoustics, vol. AU-16, No. 2, Jun. 1968, pp. 235–239.

*Primary Examiner*—Gary V. Harkcom
*Assistant Examiner*—John A. Merecki

[57] ABSTRACT

An acoustic processing unit for a speech recognition system is characterized in that the parameters are extracted from the speech data, including correlation functions, the zero crossing number of the original waveforms, the zero crossing number of the differential waveforms, and the average level of the waveforms. A suitable threshold is selected from a plurality of thresholds preliminarily stored, depending on the inputted speech volume level. The inputted speech volume level of the speaker is detected so that feedback of the detected volume level is obtained. The selected threshold set is then compared with each of the parameters to thereby make the phonemic classification. Because the plurality of threshold sets are thus automatically selected depending on the inputted speech volume level, flexible phonemic classification can be obtained to exactly detect the speech sections.

2 Claims, 5 Drawing Sheets

/N/   ........BBBBBNNNNNBBNBBBNNNNNVVVVVVVVVVVVVVVV....

/N/   ........BBBBBBNNNNNNNNNNNNNNNNNNVVVVVVVVVVVVVVV....

PHONEMIC CLASSIFICATION IN SPEECH RECOGNITION SYSTEM HAVING ACCELERATED RESPONSE TIME

BACKGROUND OF THE INVENTION

The present invention relates to a speech recognition system and, more particularly, to a system having an accelerated phonemic classification for a speech recognition system.

In the conventional speech recognition system, some speech sections are extracted based on the information of powers from inputted speech or voice. However, actually, several kinds of noises may disturb the exact extraction of the speech sections. The speech just previously voiced may damage the extraction of the following speech sections due to the articulation effect.

SUMMARY OF THE INVENTION

Accordingly, it is an object of the present invention to provide an improved speech recognition system for extracting speech sections based on phonemic classification.

It is another object of the present invention to provide an improved speech recongnition for extracting speech sections based on simple phonemic classification in each of a plurality of short sectional frames to form symbols, so that the speech sections can be extracted based on the symbols.

It is a further object of the present invention to provide an improved speech recognition system having an acoustic processing unit for making a phonemic classification based on signal waveforms of inputted speech at each of a plurality of short speech sections to form symbols.

Briefly described, in accordance with the present invention, a speech recognition system comprises an acoustic processing unit for classifying phonemes based on waveforms of inputted speech in a very short time and forming corresponding symbols. The acoustic processing unit includes extraction means for extracting various parameters including correlation functions, zero crossing frequency, zero crossing frequency of differential waveforms, and average levels of the waveforms from voice data which are A/D converted. The acoustic processing unit further includes selection means for selecting a threshold set from a plurality of threshold sets depending on the level of the inputted voice volume. The plurality of threshold sets are preliminarily stored. Phonemic classification means are further provided for comparing the extracted various parameters and the selected threshold set to enable the phonemic classification

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 5(A) and 5(B) are examples of the phonemic classification, FIG. 5(A) relating to the conventional case and FIG. 5(B) relating to the present invention.

DESCRIPTION OF THE INVENTION

Figure 1:
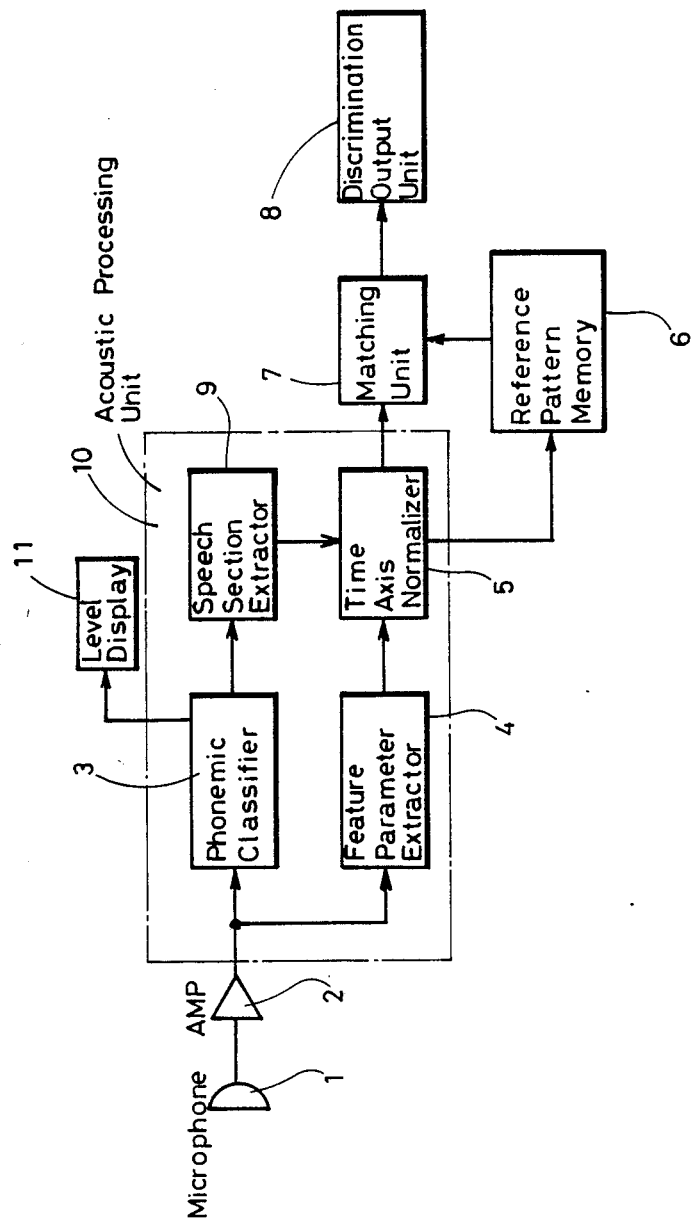
FIG. 1 is a block diagram of a speech recognition system according to a preferred embodiment of the present invention.

FIG. 1 is a block diagram of a speech recognition system according to a preferred embodiment of the present invention.

In FIG. 1, a microphone 1 is provided for generating electric signals in response to speech or voice information inputted. The microphone 1 can detect an audible frequency range of about 20 Hz to 15 KHz. It detects a frequency provided by speech of a human body without distortion. An amplifier (AMP) 2 is coupled to the microphone 1 to amplify the generated electric voice frequency without distortion.

An acoustic processing unit 10 is coupled to the amplifier 2. The acoustic processing unit 2 includes a phonemic classifier 3 and a feature parameter extractor 4.

The feature parameter extractor 4 includes a plurality of band-pass filters, a sample hold circuit, an analog switch, an A/D converter, and a logarithmic unit. The plurality of band-pass filters have different passing bands from one another. The sample hold circuit is provided for holding the output of each of the band-pass filters. The analog switch is provided for sampling the output of the sample hold circuit at an interval of about 10 milli-seconds. The A/D converter is provided for converting the output of the analog switch into the digital signals, e.g., 12 bits, and outputting them as the feature parameter. The logarithmic unit is provided for logarithmically converting the output of the A/D converter.

A time axis normalizer 5 is provided for normalizing the feature parameter logarithmically converted from the feature parameter extractor 4. The normalized feature parameter and a reference parameter stored within a reference parameter memory 6 are compared by a matching unit 7 to discriminate inputted voice information. The comparison results are inputted into a discrimination output unit 8.

According to the present invention, the phonemic classifier 3 is provided for generating a phonemic classification symbol sequence according to a phonemic classification algorithm using the several parameters given from the inputted voice information. The phonemic classification symbol sequence from the phonemic classifier 3 is applied to a speech section extractor 9 so that this extractor 9 extracts speech sections from the phonemic classification symbol sequence to input the speech section output into the time axis normalizer 5.

A level display 11 is provided for displaying the level of inputted speech volume detected by the phonemic classifier 3. The display 11 is coupled to the phonemic classifier 3.

Figure 2:
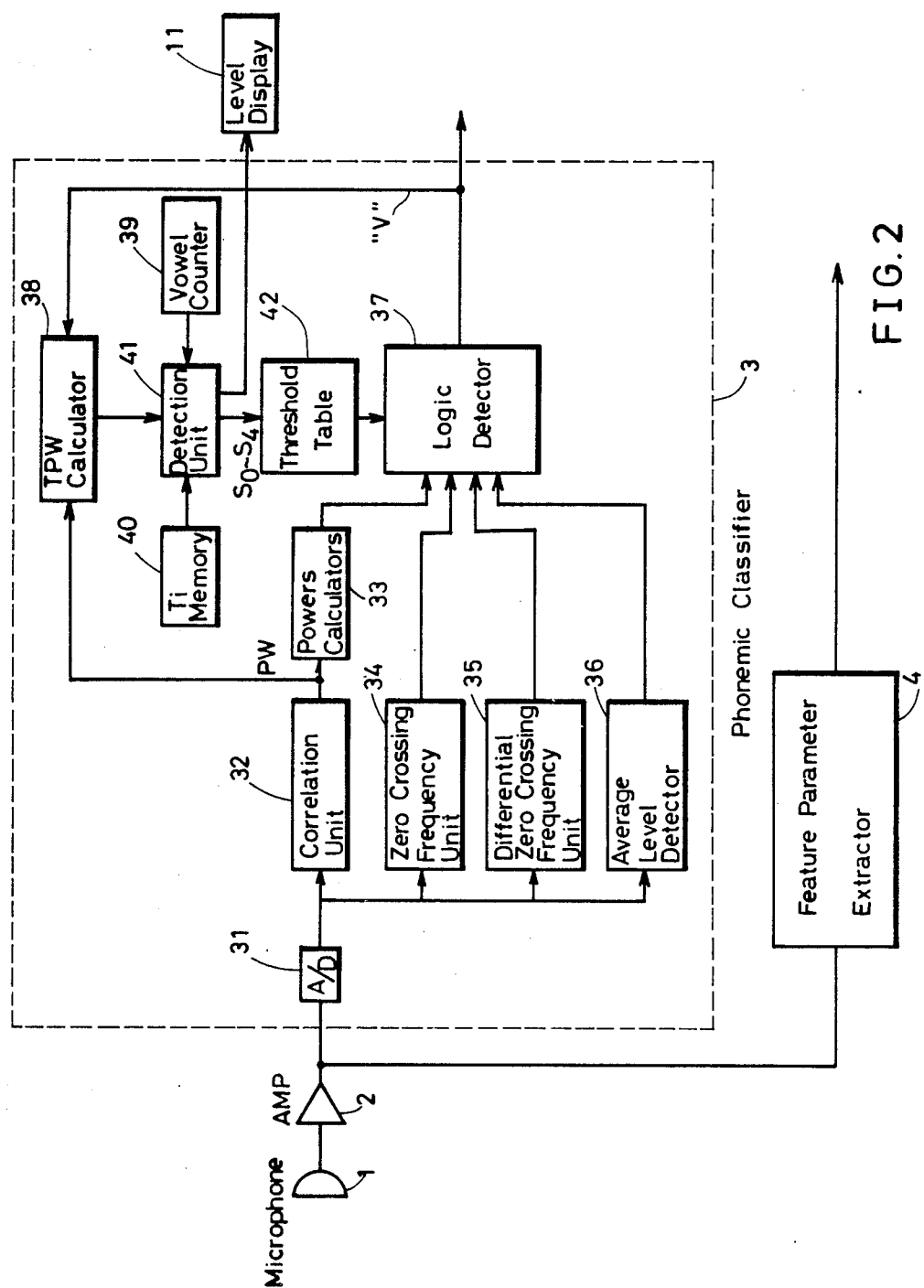
FIG. 2 is a block diagram of a phonemic classifier 3 of the circuit of FIG. 1.

FIG. 2 is a block diagram of the phonemic classifier 3.

In FIG. 2, the microphone 1 and the AMP 2 are connected to the phonemic classifier 3. In the phonemic classifier 3, an A/D converter 31 is provided for A/D converting the inputted speech waveforms and generating digital speech signals. A correlation unit 32 is provided for calculating some correlation functions from the digital speech signals. Several powers calculators 33 are provided. A zero crossing frequency unit 34 is provided for detecting the zero crossing frequency. A differential zero crossing frequency unit 35 is provided for detecting the zero crossing frequency in the differential waveforms. An average level detector 36 is provided for detecting the average level of original speech waveforms. A logic detector 37 is responsive to the calculated various parameters for generating symbolic sequence in very short time frames (speech segments for a short time of several milli-seconds to several tens of milli-seconds), depending the features of the waveforms. A total power (TPW) calculator 38 is provided for calculating the total power information (TPW) based on the power information (PW) of the original waveforms. A vowel counter 39 is provided for detecting the presence of vowels referred to as "V" hereinbelow. A Ti memory 40 is provided for storing the values of Ti (i=0–3). A detection unit 41 is provided for comparing the total PW (TPW) value with the Ti value and generating set values Si (i=0–4). A threshold table 42 is provided for storing a plurality of threshold sets.

The A/D converter 31 serves to sample the inputted speech information at about 8–24 KHz and convert them into the digital signals of 6–12 bits.

The correlation unit 32 serves to calculate zeroth-order to second-order correlation functions in every single analysis frame over sections of the sample number N (=256).

The first-order auto-correlation function "phi$_1$" is calculated as follows:

$$\phi_1 = \sum_{i=1}^{N} X_i \cdot X_i + 1$$

The second-order auto-correlation function "phi$_2$" is calculated as follows:

$$\phi_2 = \sum_{i=1}^{N} X_i \cdot X_i + 2$$

The zeroth-order auto-correlation function "phi$_0$" is calculated as follows:

$$\phi_0 = \sum_{i=1}^{N} X_i \cdot X_i$$

It represents the power PW of the original waveform.

From these values, the first-order and the second-order correlation functions C1 and C2 are calculated as follows:

$$C1 = \frac{\phi_1}{PW(=\phi_0)}$$

$$C2 = \frac{\phi_2}{PW(=\phi_0)}$$

The powers calculators 33 are provided for calculating the powers PWD of the differential waveforms other than the power PW of the original waveform and the remaining power PWF of the second-order linear prediction.

The power PWD of the differential waveform is calculated in the following equation:

$$PWD = 2 \times (1 - C1) \times PW$$

The remaining power PWF of the second-order linear prediction is calculated in the following equation:

$$PWF = \frac{(1 - C2) \times (1 - 2C1^2 + C2)}{1 - C1^2} \times PW$$

The zero crossing frequency unit 34 serves to calculate the zero crossing number ZRC in each of the analysis frames of the original waveforms "Xi". The zero crossing number ZRC is given by the following equation:

$$ZRC = \sum_{i=1}^{N} F_i$$

$$F_i = \begin{cases} 1, & \text{SIGN}(X_i) \neq \text{SIGN}(X_{i-1}) \\ 0, & \text{SIGN}(X_i) = \text{SIGN}(X_{i-1}) \end{cases}$$

where SIGN (Xi) represents the code of the waveform "Xi".

The differential zero crossing frequency unit 35 serves to calculate the zero crossing number ZRCD of the differential waveform "$X_i - X_{i-1}$". The differential zero crossing number ZRCD is given in the following equation:

$$ZRCD = \sum_{i=1}^{N} FD_i$$

$$FD_i = \begin{cases} 1, & \text{SIGN}(X_i - X_{i-1}) \neq \text{SIGN}(X_{i-1} - X_{i-2}) \\ 0, & \text{SIGN}(X_i - X_{i-1}) = \text{SIGN}(X_{i-1} - X_{i-2}) \end{cases}$$

where SIGN ($X_i - X_{i-1}$) represents the code of the differential waveform "$X_i - X_{i-1}$").

The average level detector 36 serves to calculate the average level PWA of the absolute value of the waveform "$X_i$" according to the following equation:

$$PWA = \frac{\sum_{i=1}^{N} |X_i|}{N}$$

The logic detector 37 serves to make the phonemic classification in each analysis frame based on those data PW, PWD, PWF, PWA, C1, C2, ZRC, and ZRCD, and the thresholds stored within the threshold table 42.

Figure 3:
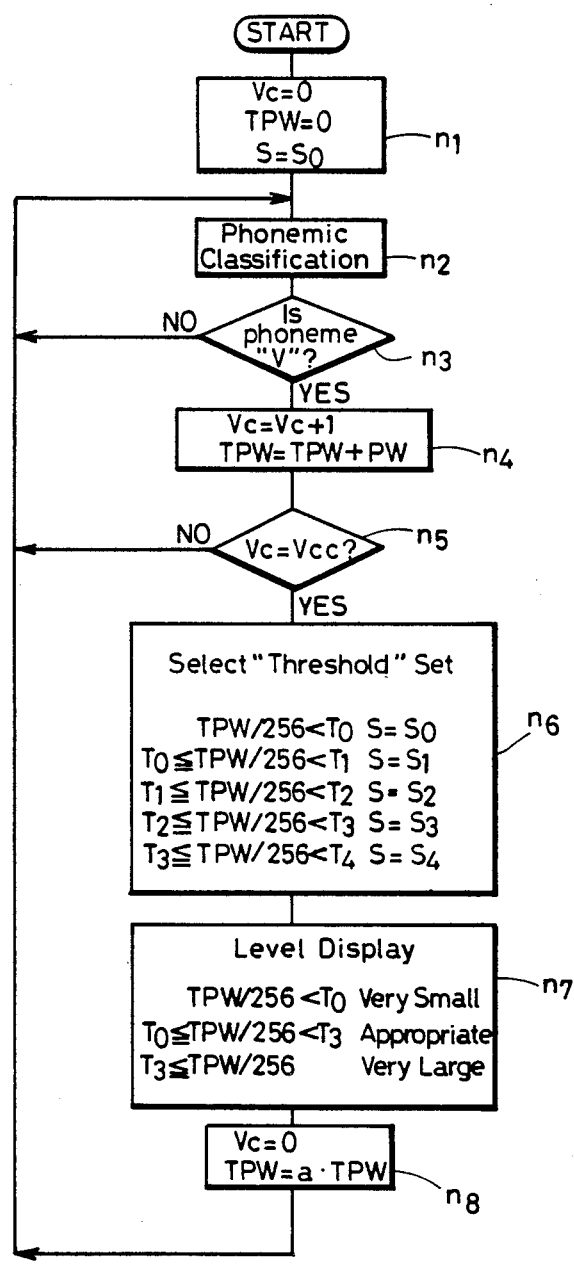
FIG. 3 is a flow chart of the operation of the speech recognition system of the present invention, showing steps of setting thresholds.

The phonemic classification is to give the symbols of ".", "B", "N", "V", "F", and "C" at each analysis frame. The respective symbols correspond to the following speech parts:

".": voiceless part
"B": buzz-bar part
"N": nasal part
"V": vowel part
"F": fricative consonant part
"C": weak fricative consonant part According to the feature of the present invention, the plurality of threshold sets Si (i=0–4) stored within the threshold table 42 are automatically selected based on the level of the inputted speech volume as shown in the flow chart of FIG. 3.

The threshold table 42 stores the plurality of thresholds corresponding to the set numbers S0–S4 specified as follows and as shown in Table I in which some specific thresholds of the set number S2 are only shown by way of example:

thresholds PW0–PW3 for the power PW of the original waveform thresholds PWD0–PWD3 for the power PWD of the differential waveform threshold PWF0–PWF2 for the remaining power PWF of the second-order linear prediction thresholds PWA0–PWA3 for the average level PWA thresholds $C1_0$–$C1_5$ for the first-order correlation function C1 threshold $C2_0$–$C2_2$ for the second-order correlation function C2 threshold $ZRC_0$–$ZRC_7$ for the zero crossing numbers ZRC and ZRCD

The Ti memory 40 serves to store the following data:
T0=5,000
T1=8,000
T2=10,000
T3=12,000

In the present invention, the threshold table 42 preliminarily stores the plurality of threshold sets Si (i=0–4). The total power (TPW) calculator 38 and the vowel counter 39 are used, so that the threshold sets are selected to be applied to the logic detector 37.

With reference to FIG. 3, the operation for automatically selecting the threshold set will be described as follows:

Step n1: In the initial condition, the vowel counter 39 and the TPW calculator 38 are reset to be zero. The threshold set S0 is selected.

Step n2: Depending on the thresholds for the various parameters of the threshold set S0, the logic detector 37 is operated to make the phonemic classification. The phoneme is detected as will be described below.

Step n3: Once the vowel "V" is detected in the phonemic classification of step n2, step n4 is selected.

Step n4: The vowel counter (Vc) 39 is counted up to thereby obtain "Vc=Vc+1". At the same time, in the TPW calculator 38, the power PW of the original waveform is added to the total PW (TPW) as "TPW=TPW+PW".

On the other hand, unless the vowel is detected in the phonemic classification, no further operation is conducted. While the phonemic classifications are repeated, the powers PW given at the time when the vowel "V" is detected are subsequently added in the TPW calculator 38.

The reason why the powers PW given at the time when the vowel "V" is detected are subsequently added are that the powers PW of the vowel parts are stable and suitable for detecting the level of the inputted speech volume.

Step n5: When the value of "Vc" is changed to "Vcc" (for example, 64) in step n5, step n6 is selected.

Step n6: The total powers TPW accumulated in the TPW calculator 38 are inputted into the detection unit 41, so that they are compared with the values of Ti (T=0–3). It is detected which threshold set of Si is to be selected.

The criteria of selecting the threshold sets Si (i=0–4) in step n6 are shown in the box of this step of FIG. 3. The threshold set S1 is selected if "T0≦TPW/256<T1" (N=the sampling number). Thus, the threshold set S0 is replaced by another threshold set S1. The threshold set S1 is applied to the logic detector 37.

Step n7: The value of total powers TPW thus calculated are compared with the value of Ti, so that both large and small distinctions, and appropriate condition are displayed in the level display 11. The level display 11 may include some light emitting diodes (LED). The level display can inform the operator that he should speak in a loud or soft voice. For this display, the output bits of the central processing unit (CPU) correspond to the conditions of very soft, very loud, and the appropriate state. The display timing should be in synchronization with selecting the thresholds.

Step n8: The vowel counter 39 is reset. The total powers TPW are multiplied by time a (for example ½).

Step n2 is reselected to thereby repeat the following operations. If "Vc=Vcc" is obtained, it is detected depending on the value of the total powers TPW whether the present threshold set is to be continued or the other sets are to be selected to replace the former.

Thus, the threshold sets are automatically replaced depending on the level of the inputted speech volume, so that a more flexible phonemic classification can be expected.

Figure 4:
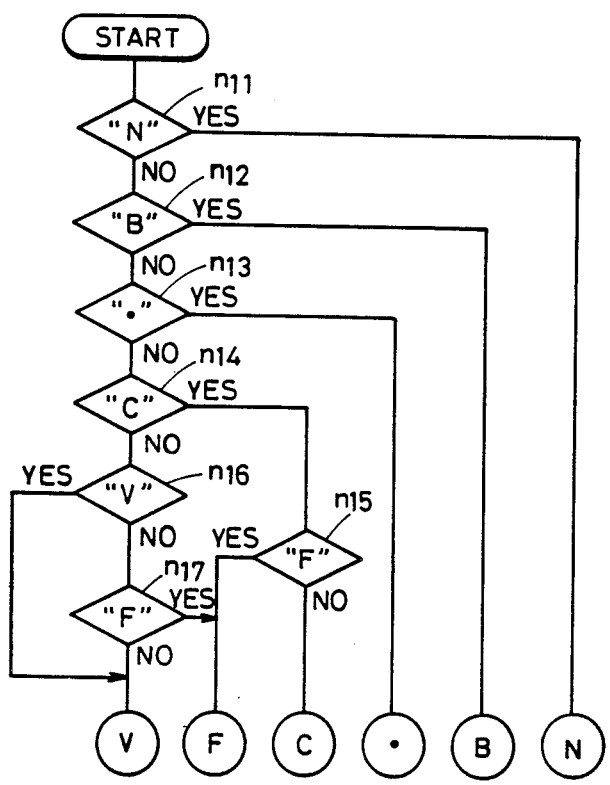
FIG. 4 is a flow chart of the phonemic classification for the present invention.

FIG. 4 is a flow chart of the phonemic classification caused by the logic detector 37.

Step n11: The nasal part "N" is discriminated according to the discrimination condition of TABLE II. That is, the nasal part "N" is detected when all the following criteria are satisfied:

1. the power PW of the original waveform is more than a threshold
2. each of the power PWD in the differential waveform and the remaining power PWF of the second-order linear prediction is smaller than a threshold
3. the first-order correlation function C1 is more than a threshold
4. the differential zero crossing number ZRCD is less than a threshold Step n12: Step n12 is executed when the nasal part "N" is not detected in step n11. In step n12, the buzz-bar part "B" is detected according to the criteria of TABLE III.

Step n13: The voiceless part "." is detected according to the criteria of TABLE IV.

Step n14: The weak fricative consonant part "C" is detected according to the criteria of TABLE V.

Step n15: The fricative consonant part "F" is detected based on the criteria of TABLE VI to discriminate the fricative consonant "F" and the weak fricative consonant "C".

Step n16: The vowel part "V" is detected based on the criteria of TABLE VII.

Step n17: The fricative consonant "F" is detected according to the criteria of TABLE VIII.

The above detections are carried out from the upper figures. Once one of the criteria is satisfied, a single operation of the phonemic classification is completed. When "N0" is detected in steps n11–n14, n16, and n17, it is assumed that it is the vowel part "V".

The above detections are carried out by comparing the extracted parameters of the inputted speech information with the threshold sets PW0–PW3, PWD0–PWD3, PWF0–PWF2, PWA0–PWA3, $C1_0$–$C1_5$, $C2_0$–$C2_2$, and $ZRC_0$–$ZRC_7$. As stated above, these threshold sets are automatically replaced depending on the inputted speech volume level, so that more flexible phonemic classification can be obtained.

FIGS. 5(A) and 5(B) are examples of the phonemic classification by speaking the syllable/NI/. FIG. 5(A) is an example by the conventional phonemic classification while FIG. 5(B) is an example of the phonemic classification according to the present invention. It is evident that the property of the phonemic classification can be improved.

Figures 5, 6:
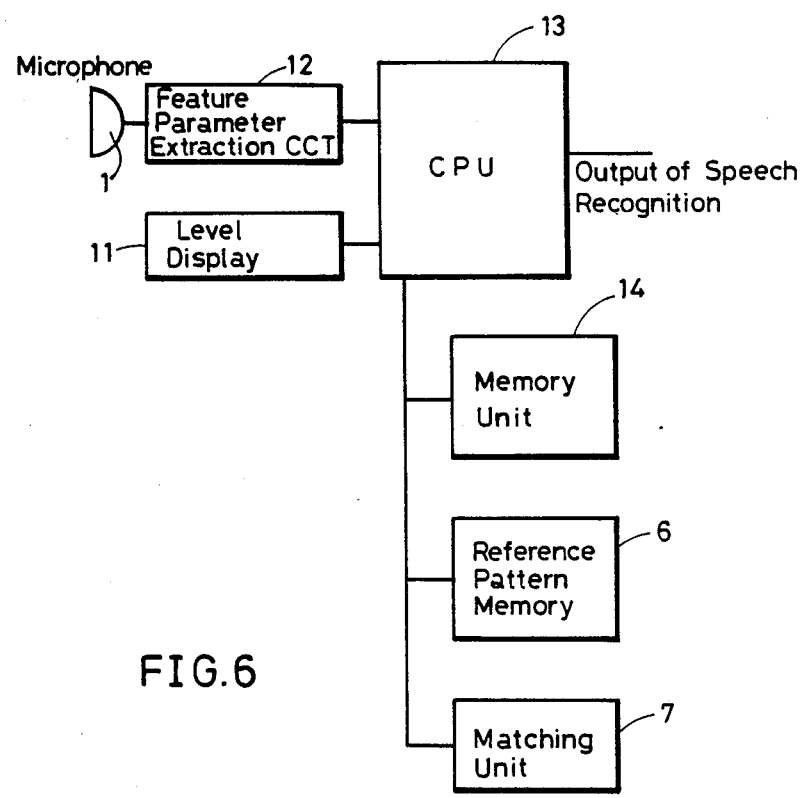
FIG. 6 is a block diagram of a speech recognition system according to another preferred embodiment of the present invention.

FIG. 6 is a version of the speech recognition system in the form of a microcomputer scheme.

The speech recognition system of FIG. 6 comprises a feature parameter extraction circuit 12, a CPU 13, and a memory unit 14 in addition to the microphone 1, the level display 11, the reference pattern memory 6, and the matching unit 7 as stated above.

Thus, according to the present invention, the parameters including the correlation functions, the zero crossing number of the original waveform, the zero crossing number of the differential waveforms, and the average levels of the waveforms are extracted from the speech data which are A/D converted. A suitable threshold set is selected from a plurality of threshold sets preliminarily stored, depending on the inputted speech volume level. The inputted speech volume level of the speaker speaking the sentence or the like is detected, so that feedback of the detected volume level is obtained. The selected threshold set is then compared with each of the parameters to thereby make the phonemic classification. Because the threshold sets are thus automatically selected depending the inputted speech volume level, a more flexible phonemic classification can be obtained to exactly detect the speech sections. The detected input speech volume level is displayed to the speaker.

While only certain embodiments of the present invention have been described, it will be apparent to those skilled in the art that various changes and modifications may be made therein without departing from the spirit and scope of the present invention as claimed.

TABLE I

| Threshold Set No. | $S_0$ | $S_1$ | $S_2$ | $S_3$ | $S_4$ |
|---|---|---|---|---|---|
| $PW_0$ | | | 60 | | |
| $PW_1$ | | | 400 | | |
| $PW_2$ | | | 1000 | | |
| $PW_3$ | | | 10000 | | |
| $PWD_0$ | | | 24 | | |
| $PWD_1$ | | | 30 | | |
| $PWD_2$ | | | 40 | | |
| $PWD_3$ | | | 60 | | |
| $PWF_0$ | | | 7 | | |
| $PWF_1$ | | | 100 | | |
| $PWF_2$ | | | 300 | | |
| $PWA_0$ | | | 20 | | |
| $PWA_1$ | | | 30 | | |
| $PWA_2$ | | | 40 | | |
| $PWA_3$ | | | 60 | | |
| $C1_0$ | | | −0.2 | | |
| $C1_1$ | | | 0.0 | | |
| $C1_2$ | | | 0.2 | | |
| $C1_3$ | | | 0.3 | | |
| $C1_4$ | | | 0.8 | | |
| $C1_5$ | | | 0.95 | | |
| $C2_0$ | | | −0.2 | | |
| $C2_1$ | | | 0.0 | | |
| $C2_2$ | | | 0.2 | | |
| $ZRC_0$ | | | 7 | | |
| $ZRC_1$ | | | 12 | | |
| $ZRC_2$ | | | 15 | | |
| $ZRC_3$ | | | 20 | | |
| $ZRC_4$ | | | 30 | | |
| $ZRC_5$ | | | 40 | | |
| $ZRC_6$ | | | 60 | | |
| $ZRC_7$ | | | 80 | | |

TABLE II

| N | $PW \geq PW_1$ and $PWD < PWD_3$ and $PWF < PWF_1$ and $C1 \geq C1_5$ and $ZRCD < ZRC_3$ |
|---|---|

TABLE III

| B | $PW_1 > PW \geq PW_0$ and $C1 \geq C1_5$, $PW_2 > PW \geq PW_1$ and $PWF \leq PWF_0$ and $C1 \geq C1_5$, $PW \geq PW_2$ and $PWD \leq PW_0$ and $PWF \leq PWF_0$ and $C1 \geq C1_5$ |
|---|---|

TABLE IV

| e | $PW < PW_1$ and $PWD < PWD_1$ and $ZRCD < ZRC_0$ |
|---|---|

TABLE V

| C | $C1 \leq C1_0$, $C1 \leq C1_1$ and $C2 \leq C2_1$, $C1 \leq C1_2$ and $C2 \leq C2_2$ and $PWA \leq PWA_3$, $C1 \leq C1_3$ and $PWA \leq PWA_1$, $C1 \leq C1_4$ and $PWA \leq PWA_0$, $C1 \leq C1_4$ and $PWA \leq PWA_2$ and $ZRCD \geq ZRC_4$ |
|---|---|

TABLE VI

| F | "C" and $ZRCD \geq ZRC_4$, "C" and $PWD \geq PW_2$ |
|---|---|

TABLE VII

| V | $C1 \geq C1_5$, $C1 \leq C1_2$ and $C2 > C2_2$ and $ZRCD \geq ZRC_5$ and $ZRC < ZRC_1$, $PW \geq PW_3$, $PWF \geq PWF_2$ |
|---|---|

TABLE VIII

| F | $ZRCD \geq ZRC_7$ |
|---|---|

What is claimed is:

1. An acoustic processing system for a speech recognition system comprising:
   input means for inputting speech waveforms;
   extraction means, responsive to said input means, for extracting a feature speech parameter from a selected one of said speech waveforms, said feature speech parameter being indicative of the varying frequency of the speech waveform during a selected period of time;
   phonemic classifier means, responsive to said input means, for making a phonemic classification representative of said speech waveforms from a selected one of said speech waveforms, said phonemic classifier means including:
   correlation means, responsive to said input means, for calculating correlation functions representing the power of a said selected speech waveform;

zero crossing frequency means, responsive to said input means, for calculating a zero crossing frequency for said selected speech waveform;

differential zero crossing frequency means, responsive to said input means, for calculating the difference between the zero crossing frequency of said selected speech waveform sand a preceding selected speech waveform;

power calculation means, responsive to said correlation means, for calculating from said correlation functions the power differential between a selected said speech waveform and a preceding speech waveform;

threshold table means for storing a plurality of sets of threshold values, each said set of threshold values including values corresponding to those values produced by said correlation means, said zero crossing frequency means, said differential zero crossing frequency means and said power calculation means;

total power calculation means, responsive to said correlation means and a logic detection means, for calculating the total power of said selected speech waveform, said total power being representative of the volume of the selected speech waveform;

detection means, responsive to said total power calculation means, for selecting a set of threshold values stored in said threshold table means corresponding to the total power of said selected speech waveform; and said logic detection means includes means for making a phonemic classification in each of a plurality of analysis frames for said selected speech waveform responsive to said correlation means, zero crossing frequency means, differential zero crossing means, and power calculation means within said selected set of threshold values;

normalization means, responsive to said extraction means and said phonemic classifier means, for normalizing said feature speech parameter to produce an acoustic pattern for said selected speech waveform;

pattern memory means for storing a plurality of reference acoustic patterns; and comparison means, responsive to said normalization means and said pattern memory means, for comparing the acoustic pattern of said selected speech waveform with said plurality of reference acoustic patterns to determine a part of speech represented by said selected speech waveform.

2. The system of claim 1, said phonemic classifier further comprising:

volume level display means, responsive to said detection means, for displaying the volume level of the selected speech waveform, corresponding to the total power calculated by the total power calculation means.

* * * * *